United States Patent [19]

Cook

[11] 4,146,285

[45] Mar. 27, 1979

[54] BUS DUCT SYSTEM

[75] Inventor: David L. Cook, Christchurch, New Zealand

[73] Assignee: Square D Company, Park Ridge, Ill.

[21] Appl. No.: 795,998

[22] Filed: May 11, 1977

[30] Foreign Application Priority Data

May 11, 1976 [GB] United Kingdom ............... 19227/76

[51] Int. Cl.² .......................... H02G 5/08; H02G 3/06
[52] U.S. Cl. .................................. 339/22 B; 174/88 B
[58] Field of Search ...................... 339/20, 21 R, 22 R, 339/22 B, 22 T, 24; 174/68 B, 72 B, 88 B, 99 B

[56] References Cited

U.S. PATENT DOCUMENTS

| 2,906,808 | 9/1959 | Krauss | 339/22 B |
|---|---|---|---|
| 2,906,811 | 9/1959 | Fisher | 339/22 B |
| 2,907,839 | 10/1959 | Carlson et al. | 339/22 B |
| 3,140,345 | 7/1964 | Kuhar et al. | 174/99 B |
| 3,180,924 | 4/1965 | Rowe | 174/88 B |
| 3,909,098 | 9/1975 | Reed et al. | 339/22 B |

FOREIGN PATENT DOCUMENTS 1344398 10/1963 France ................................. 339/22 R

OTHER PUBLICATIONS

Westinghouse Elec. Corp., Standard Control Div., H-5000 Plug-Bus Duct, B-8676, File 30-500, 11-1969.

Primary Examiner—Neil Abrams
Attorney, Agent, or Firm—Norton Lesser; Richard T. Guttman

[57] ABSTRACT

A bus duct system comprising straight sections of bus duct, bracing members in said bus duct to support a plurality of flat bus bars in spaced apart relationship, access opening for tap-off boxes having sliding doors to open and close said access openings. The bus duct sections include slots in the walls of the bus duct to receive projections of the bracing members to hold the bracing members in position within the bus duct. The bracing members are located adjacent the access openings to provide stability for connecting a tap-off box to the bus bars.

8 Claims, 19 Drawing Figures

BUS DUCT SYSTEM

BACKGROUND OF THE INVENTION

This invention relates to a bus duct system in which bus bars for carrying electric current are mounted and enclosed within sections of bus duct housing. Such bus duct systems include means for connecting tap-off units to the bus bars. Existing systems have relatively complex and expensive structures for providing tap-off connections, including supporting, bracing and mounting means at and adjacent to the sections of the bus duct in which the tap-off connection is made. In accordance with the present invention, simplified bracing members are provided as well as simplified means for securing bracing members to the bus duct. The bracing members are also located in a position to lend support to the bus bars when tap-off units are being connected thereto. The access openings are provided with simplified sliding doors, for which mounting means and track means are formed as integral parts of the bus duct walls and the cooperatively mounted bracing members.

It is an object of the present invention to provide a bus duct system which combines a bracing molding and a sliding shutter to allow, at low cost, access to the bus bars for attachment, for example, of a tap-off box.

It is a further object of the present invention to provide a bus duct system which minimizes the number of different joints required and which simplifies the construction of the joints.

According to one aspect of the present invention there is provided a bus duct system comprising an elongate section forming a housing having flat bus bars therein, means for supporting and bracing the bus bars in the housing at a number of spaced apart positions in the section and at least one sliding shutter located adjacent at least one of said means to allow access to the bus bars.

According to a second aspect of the present invention there is provided a bus duct system comprising a plurality of elongate sections forming a housing for bus bars, a number of different joints joining said sections together, the joints being formed from a number of component parts wherein at least some of said component parts are common to a number of different joints.

Embodiments of the present invention will now be described, by way of example, with reference to the accompanying drawings, in which:

DESCRIPTION OF THE PREFERRED EMBODIMENT

Figure 1:
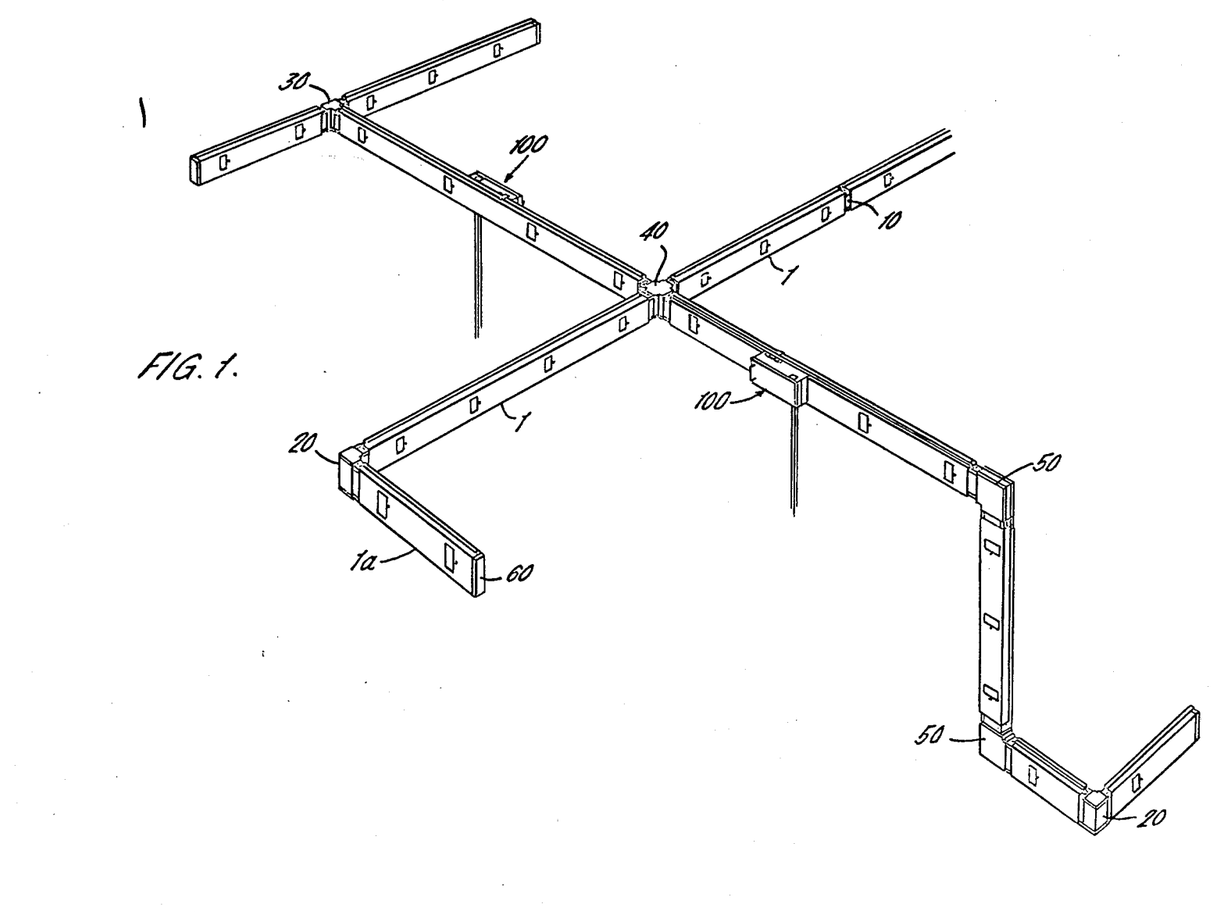
FIG. 1 is a perspective view of a bus duct system embodying both aspects of the present invention.

Referring to FIG. 1 of the drawings, there is shown a perspective view of a bus duct system in accordance with the present invention.

The system comprises a number of longitudinal sections 1 which form a housing for longitudinally extending bus bars, normally four. The sections 1 are joined by a number of different joints which will hereinafter be termed as follows:

a straight joint 10; an edgewise elbow joint 20; an edgewise tee joint 30; an edgewise cross joint 40; and a flat elbow joint 50.

The end of one section 1a is closed by an endcap 60. A number of tap-off boxes 100 may be fixed at different positions along the sections 1 in a manner to be described.

Figure 2:
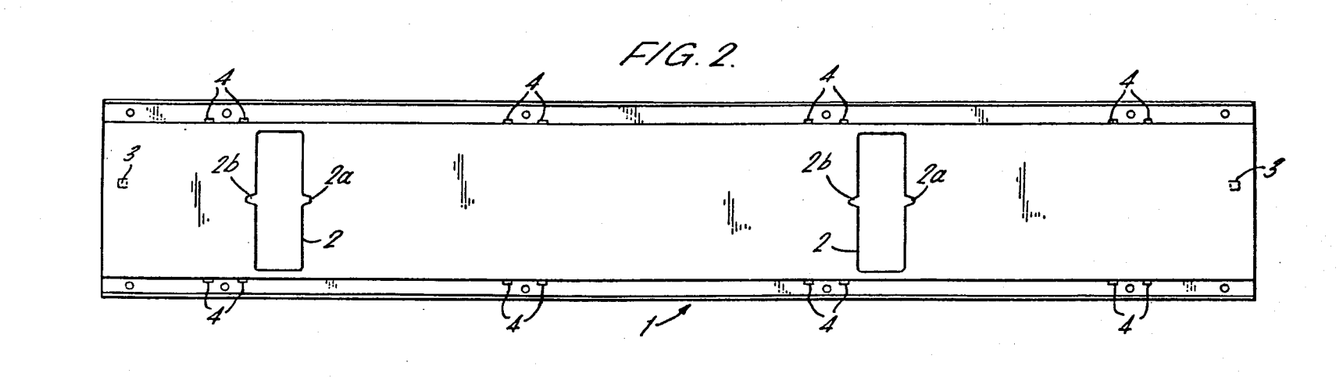
FIG. 2 is an elevational view of a section of the bus duct system of FIG. 1.
Figure 3:
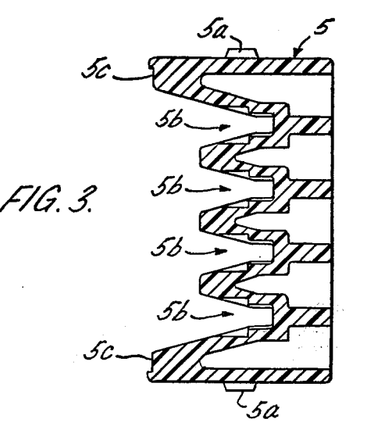
FIG. 3 is a sectional elevational view of a bracing member.
Figure 4:
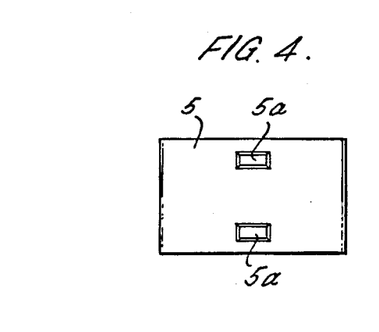
FIG. 4 is a plan view of the member of FIG. 3.

Referring now to FIG. 2, each of the longitudinal sections 1 is provided, on both of its lateral sides, with a number of spaced apart openings or passages 2. On both lateral sides and at each of the ends of the sections 1, an indentation 3 is provided offset from the central axis of the section 1 to locate one of a number of the above mentioned joints. A number of pairs of locating slots 4 are provided in each of the sections, each pair being longitudinally spaced from the adjacent pair and serving to locate a bracing member 5 (FIG. 3). Alternate pairs of slots 4 are located adjacent the openings 2.

FIG. 3 shows the bracing member 5 in the form of a molding and having projections 5a to engage the slots 4 in the duct sections 1. The bracing member 5 has four openings 5b to receive and support four bus bars 7, as can be seen in FIG. 5.

Figure 5:
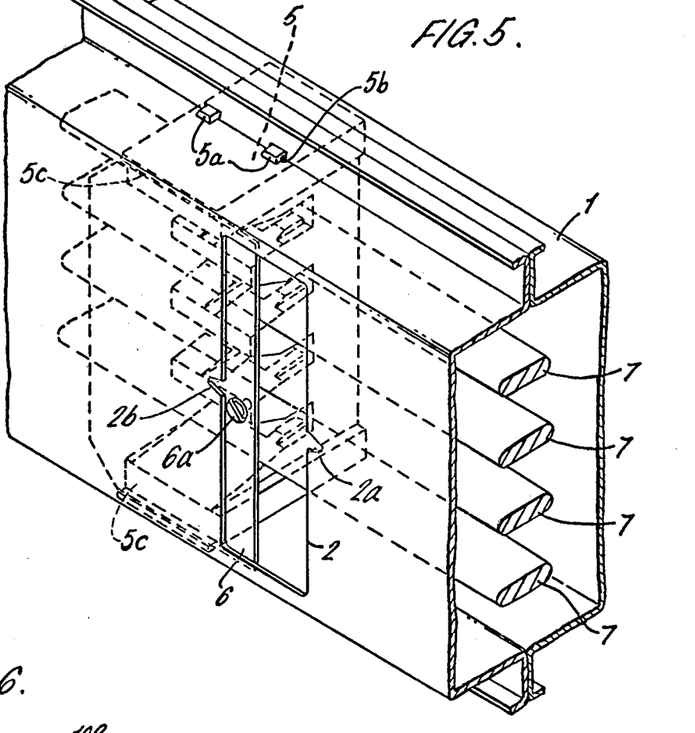
FIG. 5 is a perspective view of part of the duct section of FIG. 2 showing the location of the bracing member and the position of the sliding door.

FIG. 5 also shows the operation of a sliding shutter 6 for closing the aperture or passage 2 in an assembled duct section. The sliding door 6 slides across the opening 2 in the duct section 1 when access is not required to the bus bars 7. The shutter 6 is constrained along its top and bottom edges by a top surface and bottom surface of portions of member 5 engaging a side wall to define a guideway formed from recesses 5c on the bracing member 5 to slide along the inner face of the side of the duct section 1 and the extent of its travel is limited by a screw 6a which engages respective notches 2a and 2b of the opening 2.

Figure 6:
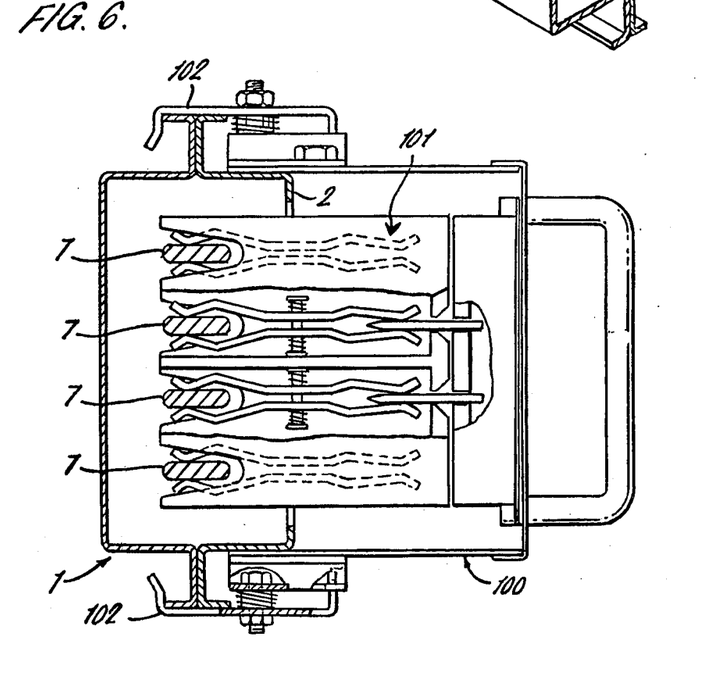
FIG. 6 is an elevational sectional view through the bus section of FIG. 5 and showing a fused tap-off box fitted to the bus bar.

FIG. 6 shows a fused tap-off box 100 mounted on the duct section 1. The tap-off box 100 is provided with four double ended jaw assemblies 101 which pass through the openings 2 and engage respective bus bars 7, the tap-off box 100 being thereafter fixed to the duct section 1 by clamps 102.

Since a bracing member 5 is located adjacent each opening 2, access is provided to the bus bars 7 adjacent the point of support of the bus bars in the duct section 1, and the bracing member directly supports the bus bars against external forces which occur on insertion of the jaws of the tap-off box 100.

Each of the different joints for joining sections of the bus duct will now be described.

The ends of bus bars 7 of one section are joined to the ends of respective bus bars of an adjacent section by means of a joint which includes at least one contact assembly 8.

Figure 7:
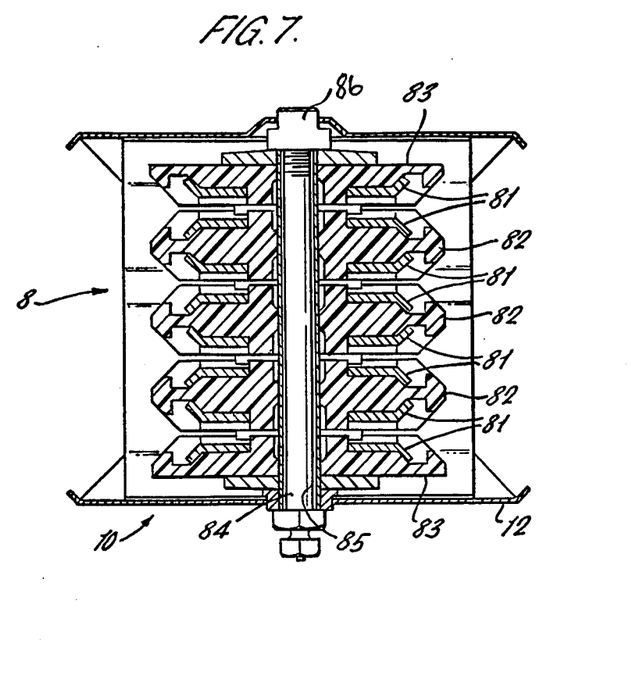
FIGS. 7 and 8 are an elevational sectional view and an end view respectively of a contact assembly mounted in a straight joint.
Figure 8:
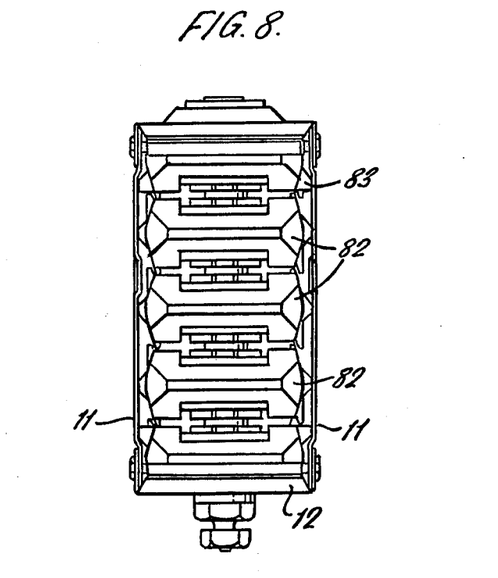

FIGS. 7 and 8 show such a contact assembly located in a straight joint 10. Each contact assembly 8 is made up of four pairs of joint contacts 81, each pair being separated by one of three insulators 82. The outermost contacts are provided with a pair of outer insulators 83. The assembly 8 is fixed together by means of a bolt 84 passing through an insulating tube 85 and engaging a nut 86.

Figure 9:
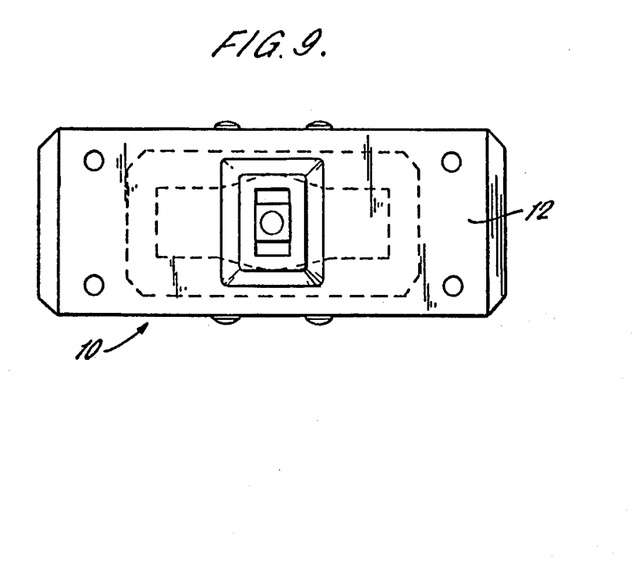
FIGS. 9 and 10 are a top plan view and a perspective view respectively of a straight joint.
Figure 10:
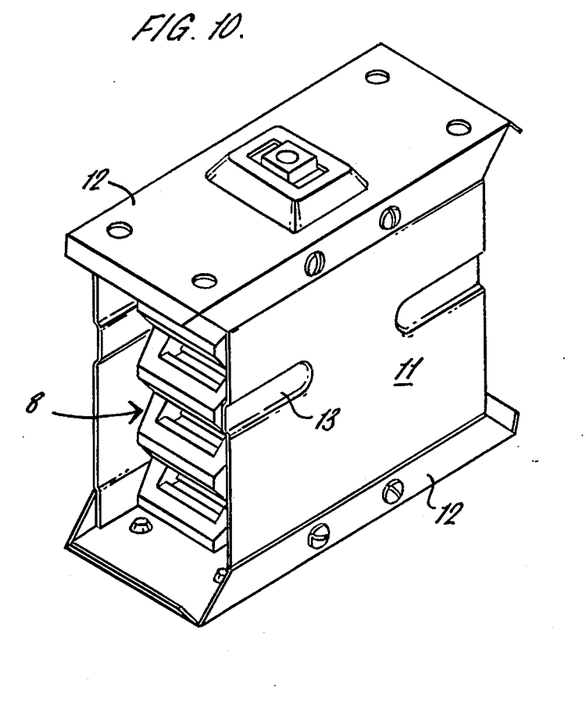

FIGS. 9 and 10 show a straight joint 10 which includes one contact assembly 8, encased in a pair of side plates 11 and top and bottom plates 12. As can be seen in FIG. 10, the side plates 11 are provided with indented portions 13 which engage the indentations 3 formed in the side members of the duct sections 1. The straight joint is so assembled that each of the indented portions 13 is located above the central axis, and, since the indentations 3 are similarly positioned in the duct section 1, the straight joint is accurately located by the cooperation of the portions 13 and the indentations 3.

Figure 11:
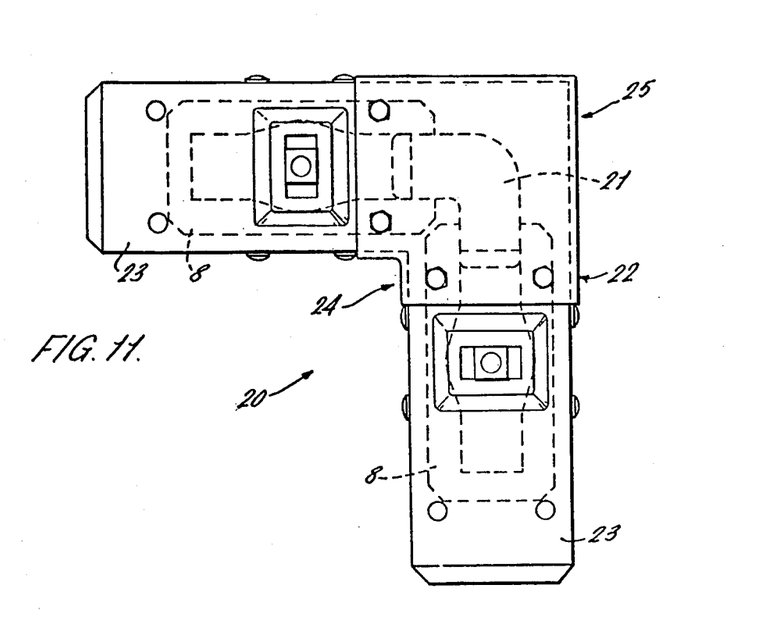
FIGS. 11 and 12 are a top plan view and a perspective view respectively of an edgewise elbow joint.
Figure 12:
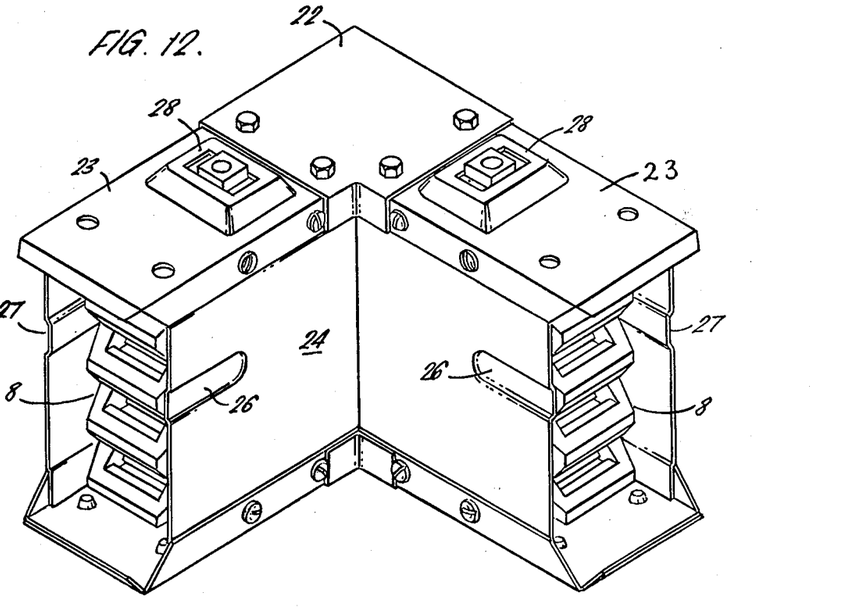

FIGS. 11 and 12 show an edgewise elbow joint 20. The edgewise elbow joint 20 includes two contact assemblies 8 arranged at right angles to each other and connected by four conducting elbow connectors 21. The housing for the edgewise elbow joint 20 is made up of top and bottom angle plates 22, two pairs of top and bottom plates or walls 23, an inside angle plate or wall 24 and an outside angle plate or wall 25. The top plate is provided with a raised portion 28 to receive the nut 86 of the contact assembly 8 and the bottom plate is provided with an aperture through which passes the head fo the bolt 84 of the contact assembly 8.

The inside angle plate 24 and outside angle plate 25 are provided with offset indented portions 26 and 27 respectively. These portions 26 and 27 engage the indentations 3 in respective duct sections 1. The orientation of the plates 24 and 25 is such that indented portions 26 and 27 are both located on the upper side of the central axis of the joint.

Both a righthand edgewise turn and a lefthand edgewise turn can be made using the same edgewise elbow joint.

Figure 13:
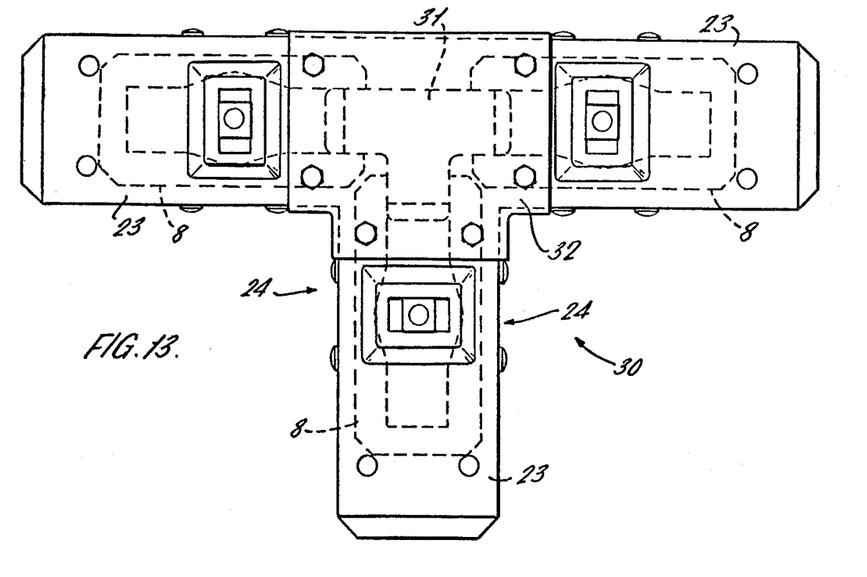
FIGS. 13 and 14 are a top plan view and a perspective view respectively of an edgewise tee joint.
Figure 14:
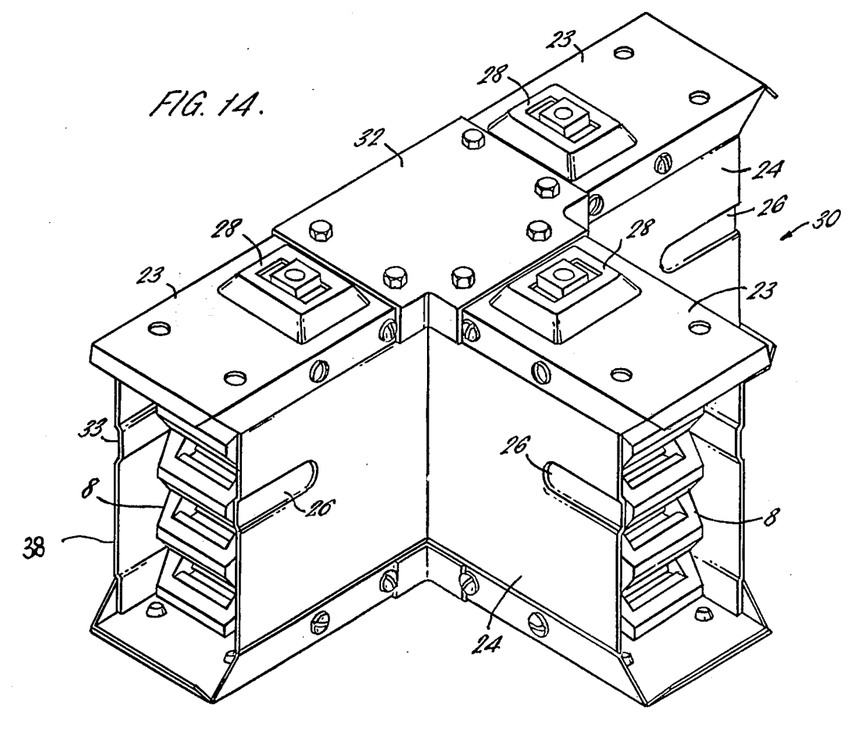

FIGS. 13 and 14 show an edgewise tee joint 30. The edgewise tee joint includes three contact assemblies 8 connected by four conducting tee connectors 31. The housing of the edgewise tee joint 30 includes top and bottom center tee plates 32 three pairs of top and bottom plates 23, two inside angle plates 24 and a rear plate 38. The rear plate 38 is provided with indented portions 33 in a manner similar to the inside angle plates 24 and which also serve to engage the indentations 3 on the duct sections 1. The inside angle plates 24 and the top and bottom plates 23 are the same as the corresponding plates of the edgewise elbow joint.

Figure 15:
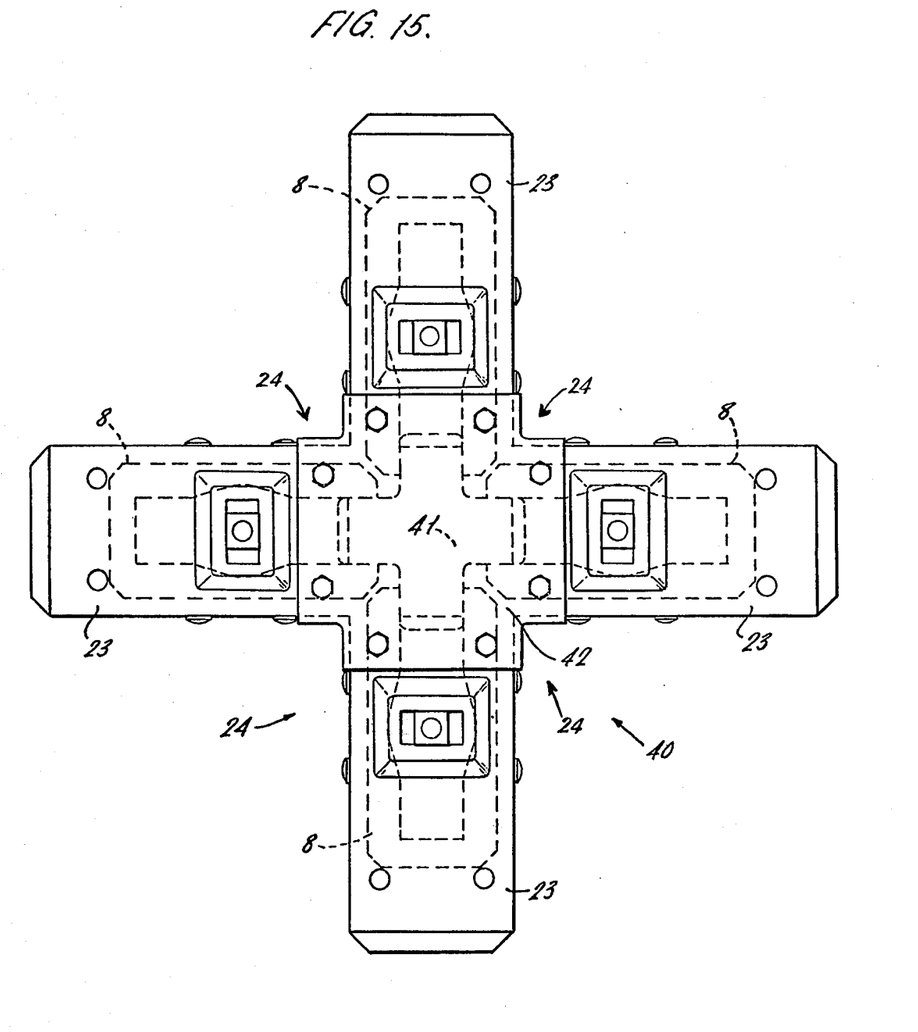
FIGS. 15 and 16 are a top plan view and a perspective view respectively of an edgewise cross joint.
Figure 16:
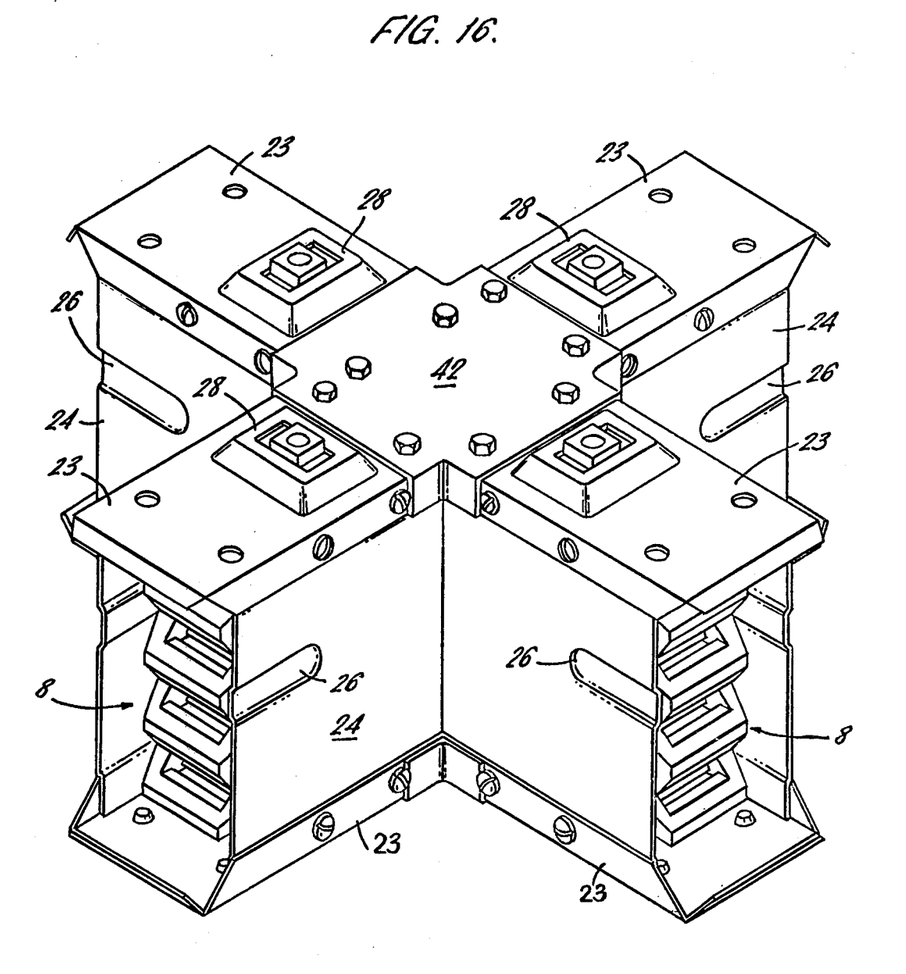

FIGS. 15 and 16 show an edgewise cross joint 40. The edgewise cross joint 40 includes four contact assemblies 8 connected by four conducting cross connectors 41. The housing for the edgewise cross joint 40 includes top and bottom center cross plates 42, four pairs of top and bottom plates 23 and four inside angle plates 24.

The inside angle plates 24 and top and bottom plates 23 are the same and the corresponding plates of the edgewise elbow joint and edgewise tee joint.

Thus, the edgewise elbow joint 20, the edgewise tee joint 30 and the edgewise cross joint 40 employ in their construction, the top and bottom plates 23 and the inside angle plates 24.

Figure 17:
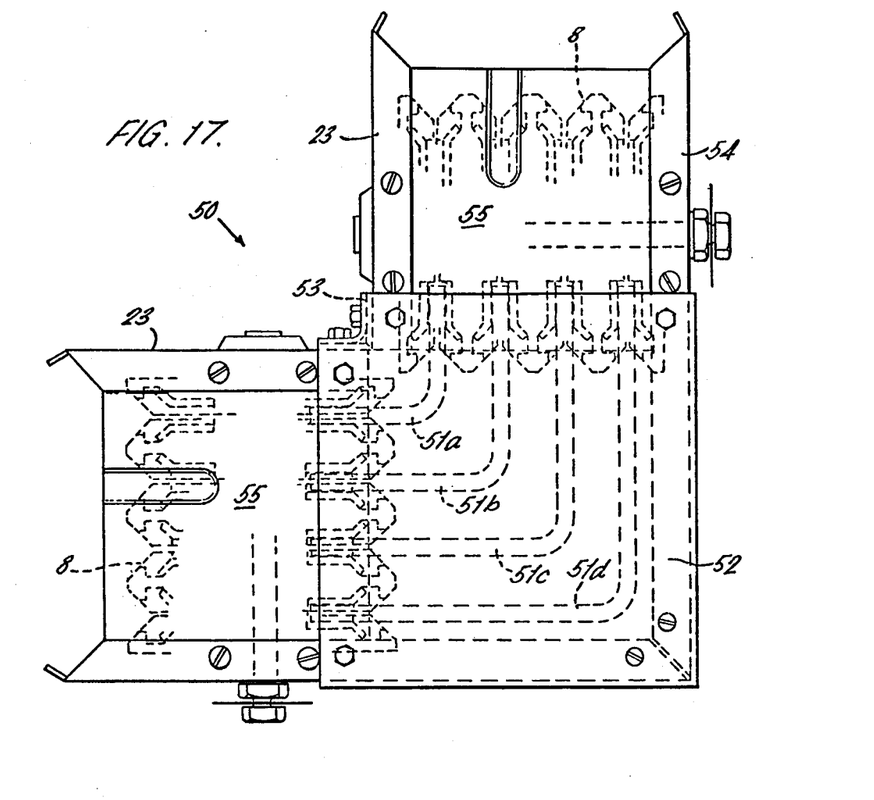
FIGS. 17 and 18 are an elevational view and a perspective view respectively of a flat elbow joint.
Figure 18:
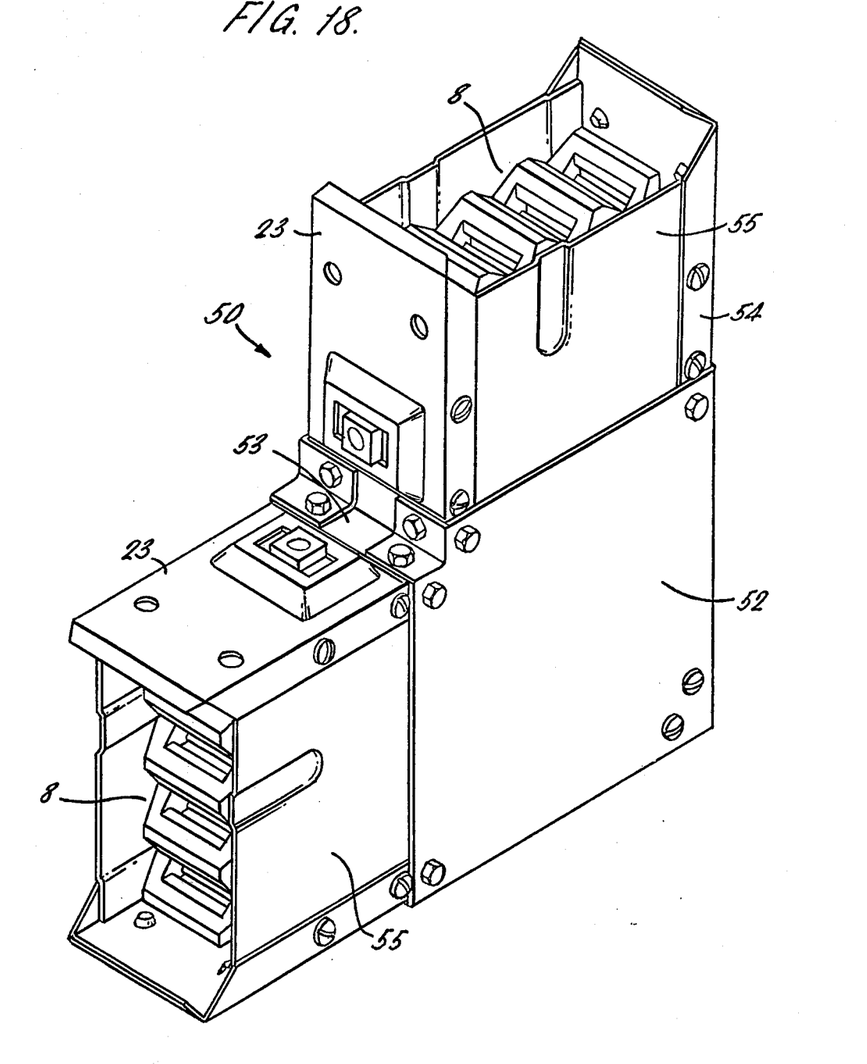

FIGS. 17 and 18 show a flat elbow joint 50. The flat elbow joint 50 includes two contact assemblies 8 connected by four "L" shaped elbow conducting connectors 51a, 51b, 51c, and 51d, respectively. The housing for the flat elbow joint 50 includes a pair of side elbow plates 52, an inside angle member 53, an outside angle plate 54, two pairs of side plates 55 and a pair of inside plates 23. The side plates 55 are provided with offset indented portions 56 which engage the indentations 3 in the duct sections 1.

The orientation of the plates 55 determines whether an upward or a downward flat elbow joint is obtained and upward or downward joints can be formed using the same components. Additionally, the inside plates 23 of the flatwise elbow joint 50 are the same as the top and bottom plates used in the edgewise joints 20, 30 and 40.

Figure 19:
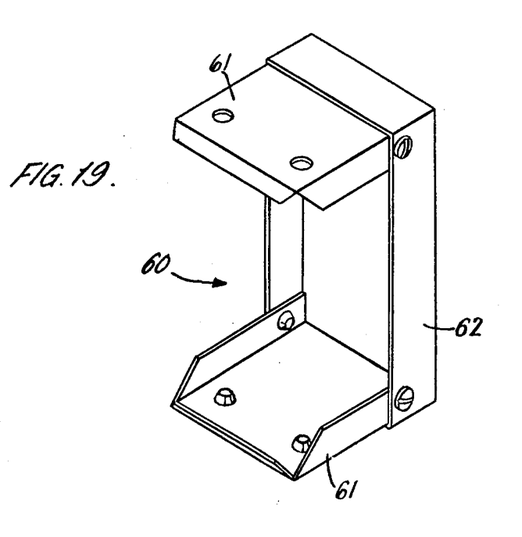
FIG. 19 is a perspective view of an end cap.

FIG. 19 shows an endcap 60 formed of top and bottom plates 61 and an endplate 62. The endcap 60 serves to close a non-connected end of a bus duct section.

We claim:

1. A bus duct assembly having a plurality of bus bars and adapted to receive a tap-off unit for extending electrical connections from each bar of said plurality of bus bars, the improvement comprising:

an elongate housing encircling said bus bars, said housing including a top wall, a bottom wall and spaced side wall portions, a passage formed in one of said side wall portions to receive said tap-off unit;

supporting means formed of insulating material for supporting and bracing the bus bars in the housing at a plurality of spaced apart positions in the housing, said means including an integrally formed molding located adjacent said passage and engaging said one side wall portion only adjacent said top wall and said bottom wall to define a guideway intermediate said top wall and said bottom wall adjacent said passage with said guideway having a top surface and a bottom surface adjacent said top wall and said bottom wall respectively; and at least one sliding shutter having a top edge and a bottom edge, said top edge and said bottom edge engaged with a top surface and a bottom surface respectively of said guideway for controlling the movement of said shutter to close said passage and to control the movement of said shutter to open said passage and enable receipt of said tap-off unit through said passage for extending an electrical connection from said bus bars.

2. A bus duct system as claimed in claim 1 wherein said molding includes an upper surface and a lower surface with each surface having at least one respective projection, said top wall and said bottom wall each having a respective slot adjacent said passage to receive a respective projection.

3. A splice joint for use in a bus duct system to join a first section of a bus duct with a transversely aligned second section of bus duct, each of said sections having a plurality of elongate flat bus bars of rectangular cross section for connection to an individually corresponding bar of the other section, the improvement comprising:

a first group of identical splice plates, said first group including a pair of metal splice plates for each bus bar of said first section for engaging opposing surfaces of each bus bar of said first section adjacent the end of each bus bar of said first section with each pair of splice plates extending in one direction;

a first housing portion receiving said first group of splice plates, said first housing portion extending in said one direction and including a first pair of spaced apart parallel side walls and a first top wall and a first bottom wall, a second group of splice plates, each identical to the splice plates of the first group, said second group including a pair of splice plates for each bar of said second section for engaging the opposing surfaces of each bar of said second section adjacent the end of each bar of said second section and individually corresponding to a pair of the splice plates engaging a respective bar of the first section with each pair of splice plates of said second group extending in a direction transverse to said one direction;

a second housing portion attached to said first housing portion and extending transverse to said one direction receiving said second group of splice plates, said second housing portion including a second pair of spaced apart parallel side walls, and a second top wall and a second bottom wall, said second top wall and said second bottom wall being interchangeable with said first top wall and said first bottom wall respectively;

means securing said first and second top and bottom walls respectively to said first and second pairs of side walls;

an insulator between each adjacent pair of said splice plates of the first group;

an insulator between each adjacent pair of splice plates of the second group;

means insulating each group of splice plates from its respective housing portion;

a metal connecting plate of rectangular cross section engaged between each pair of said splice plates of said first group and extending between the individually corresponding pair of said splice plates of said second group to provide an electrical connection from each bus bar of said first section through the respective individually corresponding pairs of splice plates and connecting plate to an individually corresponding bus bar of the second section;

first tightening means for tightening each pair of splice plates of said first group against opposing surfaces of a respective bus bar of said first section and simultaneously tightening each pair of splice plates of said first group against opposing surfaces of a respective one of said connecting plates with said first tightening means passing through said first top wall and said first bottom wall, second tightening means for tightening each pair of splice plates of said second group against opposing surfaces of a respective bus bar of said second section and simultaneously tightening each pair of splice plates of said second group against opposing surfaces of a respective one of said connecting plates with said second tightening means passing through said second top wall and said second bottom wall, and respective orienting means on said first housing portion and on said second housing portion for engaging a respective bus duct section in response to a predetermined spacial orientation of each housing portion relative the respective bus duct section.

4. A splice joint as claimed in claim 3, wherein each metal connecting plate is elbow shaped.

5. In a splice joint as claimed in claim 3, a third section of bus duct having a plurality of flat bus bars of rectangular cross section for connection to an individually corresponding bus bar of said first section and of said second section and forming a tee configuration with said first and second sections of bus duct, including:

a third group of splice plates extending colinear to said first group of splice plates, each splice plate of said third group identical to the splice plates of the first and second groups, said third group including a pair of splice plates for each bar of said third section for engaging the opposing surfaces of the respective bars of said third section adjacent the end of each bar of said third section and individually corresponding to a respective connecting plate and respective pairs of splice plates engaging respective bars of the first and second sections of bus duct;

a third housing portion attached to said first and second housing portions and receiving said third group of splice plates, said third housing portion including a third pair of spaced apart parallel side walls, and a third top wall and a third bottom wall, said third top wall and said third bottom wall being interchangeable with said first and second top walls and said first and second bottom walls respectively;

means securing said third top and bottom walls to said third pair of side walls;

an insulator between each adjacent pair of said splice plates of said third group of splice plates;

means insulating said third group of splice plates from said third housing portion;

each pair of splice plates of the third group respectively connected to one of said metal connecting plates;

said third section of bus duct longitudinally aligned with said first section of bus duct and transversely aligned with said second section of bus duct, third tightening means for tightening each pair of splice plates of said third group against opposing surfaces of respective bus bars of said third section and simultaneously tightening each pair of splice plates of said third group against opposing surfaces of a respective one of said connecting plates with said third tightening means passing through said third top wall and said third bottom wall;

orienting means on said third housing portion for engaging said third bus duct section in response to a predetermined spacial orientation of said third housing portion relative said third bus duct section.

6. A splice joint as claimed in claim 5, wherein each metal connecting plate is tee shaped.

7. In a splice joint as claimed in claim 5, a fourth section of bus duct having a plurality of flat bus bars of rectangular cross section for connection to an individually corresponding bus bar of said first section, said second section and said third section forming a cross configuration with said first, second and third sections of bus duct, including:

a fourth group of splice plates, each identical to the splice plates of the first, second and third groups, said fourth group including a pair of splice plates for each bar of said fourth section for engaging the opposing surfaces of each bar of said fourth section adjacent the end of each bar of said fourth section and individually corresponding to a respective pair of the splice plates engaging a respective bar of the first, second and third sections of bus duct;

a fourth housing portion attached to said first, second and third housing portions receiving said fourth group of splice plates, said fourth housing portion including a fourth pair of spaced apart parallel side walls, and a fourth top wall and a fourth bottom wall, said fourth top wall and said fourth bottom wall being interchangeable with said first, second and third top walls and said first, second and third bottom walls respectively, means securing said fourth top and bottom walls to said fourth pair of side walls;

an insulator between each adjacent pair of splice plates of said fourth group;

means insulating said fourth group of splice plates from said fourth housing portion;

each pair of splice plates of the fourth group respectively connected to one of said metal connecting plates;

said fourth section of bus duct being longitudinally aligned with said second section of bus duct and transversely aligned with said first and third sections of bus duct, fourth tightening means for tightening each pair of splice plates of said fourth group against opposing surfaces of respective bus bars of said fourth section and simultaneously tightening each pair of splice plates of said fourth group against opposing surfaces of a respective one of said connecting plates with said fourth tightening means passing through said fourth top wall and said fourth bottom wall;

orienting means on said fourth housing portion for engaging said fourth bus duct section in response to a predetermined spacial orientation of said fourth housing portion relative said fourth bus duct section.

8. A splice joint as claimed in claim 7, wherein each metal connecting plate is cross shaped.

* * * * *